United States Patent
Kumar Sinha et al.

(10) Patent No.: US 12,126,628 B2
(45) Date of Patent: Oct. 22, 2024

(54) ADAPTIVE AUTHORIZATION WITH LOCAL ROUTE IDENTIFIER

(71) Applicant: Microsoft Technology Licensing, LLC, Redmond, WA (US)

(72) Inventors: Abhijeet Kumar Sinha, Redmond, WA (US); Caleb Geoffrey Baker, Seattle, WA (US); Stuart Kwan, Redmond, WA (US); Zhifeng Wang, Sammamish, WA (US); Adam Edwards, Seattle, WA (US); William Bruce Barr, III, Issaquah, WA (US); Arturo Huato Lucatero, Los Angeles, CA (US); Christopher Adam Brooks, Redmond, WA (US); Carlos Adrian Lopez Castro, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 285 days.

(21) Appl. No.: 17/668,367

(22) Filed: Feb. 9, 2022

(65) Prior Publication Data
US 2023/0254321 A1    Aug. 10, 2023

(51) Int. Cl.
*H04L 9/40*        (2022.01)
(52) U.S. Cl.
CPC ........ *H04L 63/107* (2013.01); *H04L 63/0272* (2013.01); *H04L 63/20* (2013.01)
(58) Field of Classification Search
CPC . H04L 63/0272; H04L 63/0281; H04L 63/10; H04L 63/107; H04L 63/20
See application file for complete search history.

(56) References Cited

U.S. PATENT DOCUMENTS

| | | | |
|---|---|---|---|
| 8,769,063 B2 * | 7/2014 | Barton | H04L 63/10 709/229 |
| 8,799,994 B2 * | 8/2014 | Barton | H04L 67/10 726/1 |
| 8,806,570 B2 * | 8/2014 | Barton | H04W 12/08 726/1 |

(Continued)

FOREIGN PATENT DOCUMENTS

| JP | 2018032936 A | 3/2018 |
|---|---|---|
| WO | 2013081962 A1 | 6/2013 |

OTHER PUBLICATIONS

"International Search Report and Written Opinion Issued in PCT Application No. PCT/US23/010260", Mailed Date: Apr. 6, 2023, 14 Pages.

(Continued)

*Primary Examiner* — Sharon S Lynch
(74) *Attorney, Agent, or Firm* — Schwegman Lundberg & Woessner, P.A.

(57) ABSTRACT

Generally discussed herein are devices, systems, and methods for adaptive authorization using a local route as a named location. A method can include defining a local route and a corresponding local route endpoint, associating a compute resource as a destination of the local route endpoint, defining an adaptive authorization policy that limits access to the compute resource to be through the local route endpoint, and enforcing access to the compute resource based on the defined adaptive authorization policy.

12 Claims, 6 Drawing Sheets

(56) References Cited

U.S. PATENT DOCUMENTS

| | | | | |
|---|---|---|---|---|
| 8,869,235 | B2* | 10/2014 | Qureshi | H04L 67/10 713/153 |
| 8,881,229 | B2* | 11/2014 | Barton | H04W 12/30 726/1 |
| 8,886,925 | B2* | 11/2014 | Qureshi | H04L 63/0428 713/150 |
| 9,043,480 | B2* | 5/2015 | Barton | H04W 12/06 709/229 |
| 9,111,105 | B2* | 8/2015 | Barton | H04L 51/08 |
| 9,137,262 | B2* | 9/2015 | Qureshi | H04L 9/0822 |
| 9,143,529 | B2* | 9/2015 | Qureshi | H04L 9/0825 |
| 9,143,530 | B2* | 9/2015 | Qureshi | H04L 9/0891 |
| 9,154,488 | B2* | 10/2015 | Innes | H04L 63/0884 |
| 9,183,380 | B2* | 11/2015 | Qureshi | H04W 12/37 |
| 9,213,850 | B2* | 12/2015 | Barton | H04L 63/102 |
| 9,286,471 | B2* | 3/2016 | Qureshi | G06F 8/53 |
| 9,378,359 | B2* | 6/2016 | Qureshi | G06F 21/6218 |
| 9,450,944 | B1* | 9/2016 | Sousley | H04L 63/0807 |
| 9,509,684 | B1* | 11/2016 | Dixson-Boles | H04L 63/083 |
| 9,509,692 | B2* | 11/2016 | Innes | H04L 63/0884 |
| 9,521,147 | B2* | 12/2016 | Barton | G06F 21/604 |
| 9,529,996 | B2* | 12/2016 | Qureshi | H04W 12/06 |
| 9,584,515 | B2* | 2/2017 | Hayton | H04L 63/10 |
| 9,762,563 | B2* | 9/2017 | Davis | H04L 61/2571 |
| 9,794,227 | B2* | 10/2017 | Laivand | H04L 63/0281 |
| 10,044,757 | B2* | 8/2018 | Qureshi | H04W 4/02 |
| 10,063,595 | B1* | 8/2018 | Qureshi | H04L 63/0471 |
| 10,218,679 | B1* | 2/2019 | Jawahar | H04W 12/08 |
| 10,402,546 | B1* | 9/2019 | Qureshi | H04L 9/0822 |
| 10,469,534 | B2* | 11/2019 | Qureshi | H04L 63/20 |
| 10,992,473 | B2* | 4/2021 | Jawahar | H04L 9/3268 |
| 11,134,104 | B2* | 9/2021 | Qureshi | H04L 63/0471 |
| 11,245,682 | B2* | 2/2022 | Kukreja | G06F 21/335 |
| 11,533,312 | B2* | 12/2022 | Kuppannan | H04L 63/0209 |
| 2014/0006347 | A1* | 1/2014 | Qureshi | H04W 12/06 707/783 |
| 2014/0006772 | A1* | 1/2014 | Qureshi | G06F 8/53 713/150 |
| 2014/0007048 | A1* | 1/2014 | Qureshi | H04L 9/0891 717/110 |
| 2014/0007182 | A1* | 1/2014 | Qureshi | G06F 21/6218 726/1 |
| 2014/0007183 | A1* | 1/2014 | Qureshi | H04L 63/0428 726/1 |
| 2014/0007192 | A1* | 1/2014 | Qureshi | H04W 12/30 726/3 |
| 2014/0007193 | A1* | 1/2014 | Qureshi | H04W 12/30 726/3 |
| 2014/0007214 | A1* | 1/2014 | Qureshi | G06F 21/14 726/3 |
| 2014/0007222 | A1* | 1/2014 | Qureshi | H04L 67/10 726/16 |
| 2014/0032691 | A1* | 1/2014 | Barton | H04W 12/08 709/206 |
| 2014/0032733 | A1* | 1/2014 | Barton | G06F 21/6218 709/223 |
| 2014/0032758 | A1* | 1/2014 | Barton | H04L 41/00 709/225 |
| 2014/0032759 | A1* | 1/2014 | Barton | H04W 12/08 709/225 |
| 2014/0033271 | A1* | 1/2014 | Barton | H04W 12/64 726/1 |
| 2014/0040638 | A1* | 2/2014 | Barton | H04L 41/00 713/193 |
| 2014/0040977 | A1* | 2/2014 | Barton | H04W 12/37 726/1 |
| 2014/0040978 | A1* | 2/2014 | Barton | H04W 12/08 726/1 |
| 2014/0040979 | A1* | 2/2014 | Barton | H04W 12/30 726/1 |
| 2014/0053234 | A1* | 2/2014 | Barton | H04W 12/06 726/1 |
| 2014/0095894 | A1* | 4/2014 | Barton | G06F 21/6218 726/1 |
| 2014/0096186 | A1* | 4/2014 | Barton | G06F 21/6218 726/1 |
| 2014/0331297 | A1* | 11/2014 | Innes | H04L 63/0823 726/7 |
| 2014/0337528 | A1* | 11/2014 | Barton | H04L 41/00 709/225 |
| 2015/0256514 | A1* | 9/2015 | Laivand | H04L 63/105 726/3 |
| 2015/0319174 | A1* | 11/2015 | Hayton | H04L 63/0884 726/7 |
| 2015/0365412 | A1* | 12/2015 | Innes | H04L 63/12 726/7 |
| 2016/0099972 | A1* | 4/2016 | Qureshi | H04L 67/10 726/1 |
| 2017/0054760 | A1* | 2/2017 | Barton | H04L 63/0823 |
| 2017/0111336 | A1* | 4/2017 | Davis | H04L 63/029 |
| 2019/0149514 | A1* | 5/2019 | Jawahar | H04L 63/10 726/7 |
| 2019/0238592 | A1* | 8/2019 | Qureshi | G06F 21/53 |
| 2019/0258781 | A1* | 8/2019 | Qureshi | H04W 12/64 |
| 2020/0127994 | A1* | 4/2020 | Kukreja | G06F 21/31 |
| 2021/0014233 | A1* | 1/2021 | Kuppannan | H04L 63/0209 |
| 2022/0272117 | A1* | 8/2022 | Maheve | H04L 63/1416 |

OTHER PUBLICATIONS

Flores, et al., "What is Conditional Access?", Retrieved from: https://docs.microsoft.com/en-us/azure/active-directory/conditional-access/overview, Dec. 3, 2021, 6 pages.

Sudbring, et al., "What is Azure Private Link?", Retrieved from: https://docs.microsoft.com/en-us/azure/private-link/private-link-overview, Sep. 1, 2021, 7 Pages.

* cited by examiner

ADAPTIVE AUTHORIZATION WITH LOCAL ROUTE IDENTIFIER

BACKGROUND

Current conditional access policies allow an administrator to restrict compute resource access in a limited number of ways. Conditional access policies control resource access based on identity-based signals. Conditional access policies, in their simplest form, are if-then statements like "if action X then allow access to resource Y". The action, X, can be multi-factor authentication, an enumerated internet protocol (IP) address, a request coming from a device in a specified geographic location, providing credentials indicating membership in a group, a request coming from a specific device, a request coming from a specific application, or a combination thereof.

SUMMARY

A device, system, method, and computer-readable medium configured for improved adaptive authorization are provided. Embodiments simplify adaptive authorization policy definition and enforcement by defining a local route in a private network and an endpoint for the local route that is also within the private network. Instead of managing public internet addresses that tend to change over time, a single, immutable endpoint identifier can be managed to perform the same function as managing the public internet addresses.

A method can include defining a local route and a corresponding local route endpoint. A compute resource can be associated as a destination of the local route endpoint. An adaptive authorization policy that limits access to the compute resource to be through the local route endpoint can be defined. Access to the compute resource can be enforced based on the defined adaptive authorization policy. The local route can be entirely within a private network. The local route endpoint can be associated with a local route identifier and the method includes providing the local route identifier as evidence that the access is through the local route endpoint.

A second adaptive authorization policy can be defined that limits access to the local route endpoint, a first virtual network hosting the local route endpoint, or a second virtual network through which the local route endpoint is accessible. The adaptive authorization policy can include the local route endpoint as a named location. The local route endpoint can serve as a proxy for an authorization service that controls access to compute resources of the private network. The local route identifier can be immutable.

DETAILED DESCRIPTION

Figure 1:
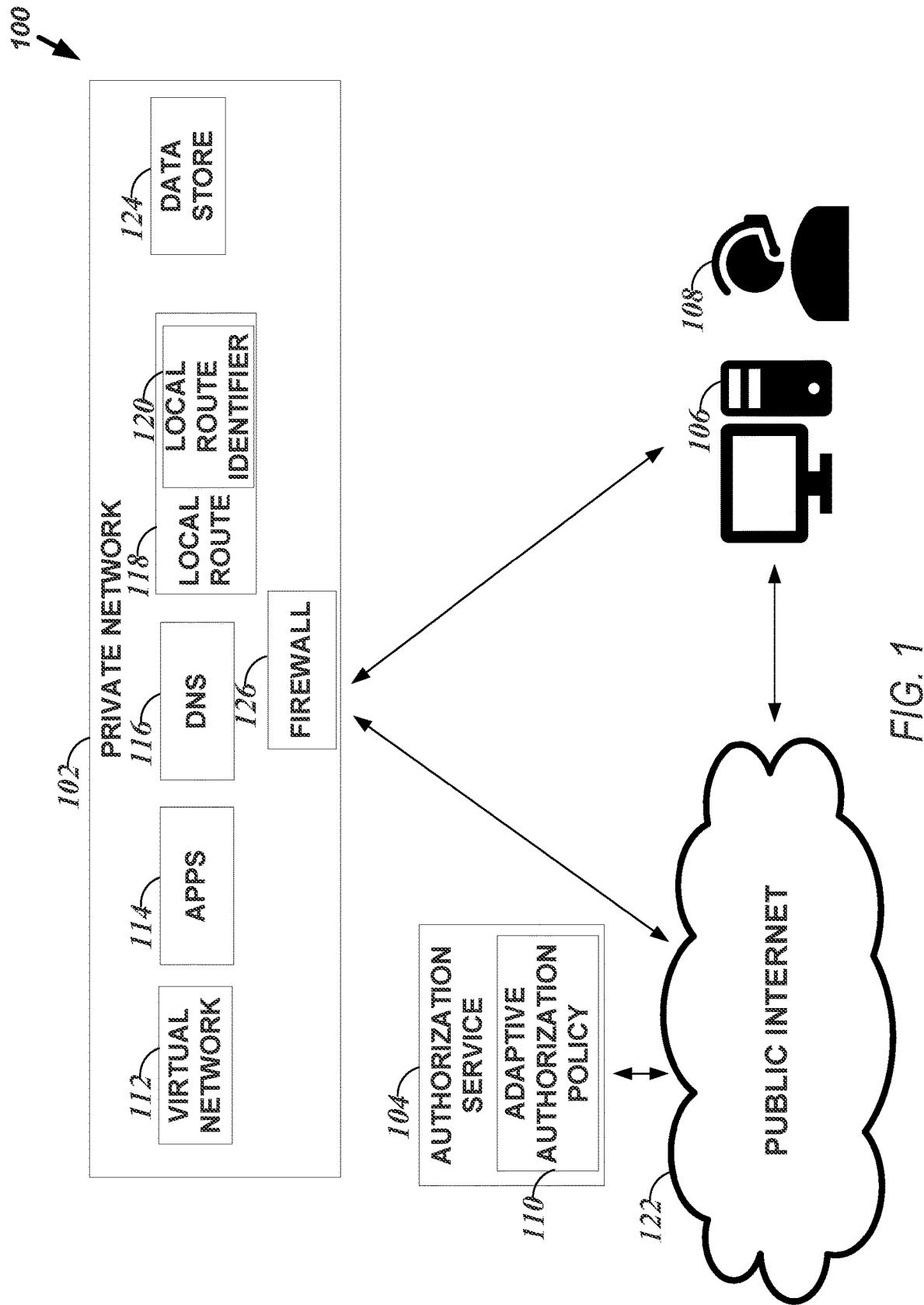
FIG. 1 illustrates, by way of example, a block diagram of an embodiment of a compute resource as a service (XaaS) system.

Embodiments provide support for expanded adaptive authorization (sometimes called "conditional access") policy definition that improves adaptive authorization policy generation and enforcement. The expanded adaptive authorization can use a local route. A local route is a framework that restricts access to only local traffic of a private network. Only local traffic in this context means traffic that does not go to the public interact and remains within the infrastructure of the private network. For example, a user of software as a service (SaaS), platform as a service (PaaS), or infrastructure as a service (IaaS) (jointly referred to herein as "XaaS") can limit access within the XaaS to resources accessible within only the network hosting the XaaS. The network hosting the XaaS is sometimes called a private network. Limiting access to resources or traffic within only the private network can help keep the XaaS more secure. By restricting access to resources through only local traffic, users without credential access to the XaaS that could not access the XaaS by logging in cannot gain access by compromising a public internet request or response. This makes the XaaS more secure as it is less vulnerable to some forms of cyberattack, such as those that include spoofing, sniffing, brute force, or the like. With a local route, a user can use XaaS building blocks (virtual networks (VNETS), express route, domain name system (DNS), a data store, a combination thereof, or the like) to customize the flow of connections to selected XaaS services, or user-owned services hosted on the XaaS through private endpoints, which avoid all public Internet routing for those connections when accessed from within the XaaS network and enforce resource specific network access control policies following the Xaas structure.

Embodiments extend a local route to an authorization service (AS). Active directory (AD) from Microsoft Corporation of Redmond, Washington is an example of a AS. AS is a database and set of services that connect users with the services and manages user access to the services by requiring identity proof. The AS can receive a request from a user, through the public internet, to access a service. The user can attempt to provide identity information that proves they have access to the service. The AS can allow access to the service if the identity information matches information for a user that is allowed to access the service. Allowing access typically includes the AS providing a token that the user can provide to the service. When the service receives a valid token, it can provide the user with access to the service.

Typical AS access occurs with a public internet request and response. Thus, if a user is currently accessing a resource of an XaaS and wants to access another resource of the XaaS, the user would issue, through the private network, a public internet request to get a token to access another resource of the XaaS. Then, the user would use the token, potentially over a local route, to access the resource. This public internet request and response going outside of the XaaS infrastructure to access a resource within the XaaS infrastructure introduces a vulnerability in the XaaS. Extending the local route capability to the AS will help limit or eliminate this vulnerability. Obtaining a token from a virtual network hosting the local route provides a proxy for the AS that allows a user to access their resources privately, while still enforcing adaptive authorization and without going over public internet. Obtaining the token from the virtual network also helps reduce or eliminate the vulnerabilities associated with accessing the public internet from within the XaaS infrastructure (sometimes called the private network).

Embodiments extend adaptive authorization to include a local route endpoint. A user can specify, in an adaptive authorization policy, one or more local route endpoints required to access an XaaS resource. A user can then be required to access the local route endpoint to access the XaaS resource. The local route endpoint acts as a proxy for the AS and does not require a public internet request. The local route endpoint retains traffic within the XaaS network, keeping the traffic that would normally be routed to the AS through a public network on the private network.

Reference will now be made to the FIGS. to describe further details of embodiments. In the FIGS. components with a same reference number with an alphabetical suffix refers to a specific instance of a general component that is identified by the same reference number without a suffix. Different alphabetical suffixes refer to different instances of the general component.

FIG. 1 illustrates, by way of example, a block diagram of an embodiment of a system 100 for adaptive authorization using a local route as a named location. The system 100 as illustrated includes a private network 102 (e.g., an XaaS), an authorization service 104, a client device 106, and a user 108.

The private network 102 provide infrastructure, platform, or software (apps 114) as a service. The private network 102 provides compute device functionality to client devices, such as the client device 106. The resources of the private network 102 include a virtual network 112, apps 114, data store 124, and a domain name system (DNS) 116.

The virtual network 112 includes one or more virtual machines (VMs) that can provide computer functionality. The user 108 can deploy software (e.g., one or more apps 114) that can be accessed through the virtual network 112 or can access another entities software (e.g., one or more apps 114) through the virtual network 112.

The apps 114 are software programs that perform programmed functionality. They are a wide variety of software programs, such as electronic mail management, web browsers, photography or video editing, communication or virtual meeting programs, simulations, text editing, presentation editing, vulnerability scanning, computer aided design, file management, music or video playing or recording, payroll management, bank account management, among many, many others. The apps 114 can be any of these types of software programs. The software programs can be deployed on the private network and their access can be managed by the authorization service 104.

The DNS 116 manages mappings between names of resources and locations of those resources. The DNS 116 can be used in routing traffic between a source and a destination. The resources can be local to the private network 102 or remote to the private network 102. Local to the private network 102 means the resource is reachable without a request to the public internet 122 or another network.

The local route 118 is a resource that provides routing between resources of the private network 102 entirely within the private network 102. With the local route 118 the user 108 can use the private network resources (e.g., the virtual network 112, apps 114, DNS 116, data store 124, among others) to customize the flow of connections to selected resources through private endpoints. The endpoints avoid routing through the public internet 122 when accessed from within the private network 102. The local route 118 still allows for enforcement of resource specific network access control policies, such as through the authorization service 104 or locally using a local route identifier 120 that represents the local route 118. The local route identifier can be immutable (unchanging). Embodiments allow an endpoint of the local route 118 to extend to the authorization service 104, such as by defining an adaptive authorization policy 110 that uses the local route endpoint as a named location that the user must access to access a resource of the private network 102. Named locations are custom rules that define network locations which can then be used in the adaptive authorization policy 110.

The local route 118 is sometimes called a private link. Using the local route 118, the virtual network 112 can connect to other services on the private network 102 without a public IP address at the source or destination. Service providers can render their services in their own virtual network 112 and the user 108 can access those services in their local virtual network 112. The local route 118 handles the connectivity between the services over a backbone network of the private network 102. Using the local route 118, one can access services running in the private network 102 from on-premises over private peering, virtual private network (VPN) tunnels, and peered virtual networks using private endpoints. With the local route 118, there is no need to configure peering or traverse the interne to reach the service. To enable the local route 118, a private endpoint is mapped to an instance of a resource instead of the entire service. Consumers can only connect to the specific instance over the local route 118. Access to any other resource in the service is blocked.

The data store 124 allows the user 108 to store their data or access data uploaded by other tenants of the private network 102. The data store 124 can store data of a tenant and access to the data on the data store 124 can be controlled by an adaptive authorization policy 110.

The authorization service 104 controls access to resources of the private network 102 using an adaptive authorization policy 110. The resources of the private network 102 include a virtual network 112, apps 114, domain name system 116, local route 118, or the data store 124, among others.

The adaptive authorization policy 110 commonly allows the user 108 to restrict access to the resources of the private network 102 based on geographical location and IP address. The adaptive authorization policy 110 is extended to allow the user 108 to define a defined endpoint of the local route 118 as a named location. The user 108 can then force access to the resource to go through the local route endpoint. The user 108 can prove they are accessing through the local route 118 using the local route identifier 122. The local route identifier 122 is globally unique. The local route identifier 122 is only attached to a network packet if a network call is coming over the local route 118. Thus, the local route identifier 122 can only be gained by the user 108 through a local route endpoint.

The private network 102 includes resources that are either developed by the user 108, or another entity, and deployed on the private network 102. The resources of the private network 102 can be accessed by the user 108 presenting a valid token to the firewall 126 of the private network 102. The user 108 can request a token from the authorization service 104, through the firewall 126, to access a resource of the private network 102. If the user 108 can satisfy conditions for accessing the resource, the authorization service 104 will provide a token to the user 108. The user 108 can then present the token to the private network 102 to achieve access to the resource.

Requesting the token occurs outside of the private network 102 and exposes the client device 106 or the private network 102 to some forms of cyber attacks. It is desired to provide the user 108 with access to resources of the private network 102, while still controlling who, what devices, what applications, and where the devices reside, to access the resources without having traffic over public internee 122. To accomplish this, the user 108 can generate, at the private network 102, a local route 118 for the authorization service 104. The local route 118 is a link between resources that is hosted locally on the private network 102. Then the user 108 can access the authorization service 104 and configure an adaptive authorization policy 110 that allows access to the resource through a defined endpoint of the local route 118. This can include the user 108 creating a named location for the local route endpoint and forcing traffic to the resource to go through the local route endpoint using the adaptive authorization policy conditions.

Using the local route endpoint of the local route 118 as a location in the adaptive authorization policy 110 provides a way to restrict access based on traffic travelling over the local route 118 and through the local route endpoint. The local route endpoint is represented by the immutable, globally unique secure network identifier 120. The user 108 can get a token for accessing the local route endpoint from the virtual network hosting the local route endpoint by satisfying the adaptive authorization policy 110 associated with the local route 118. Then the user 108 can access the local route endpoint in the private network 102. The local route identifier 120 can be provided to the user 108 that successfully accesses the local route endpoint. The local route identifier 120 is proof that the user 108 accessed the local route endpoint and that their traffic is coming over the local route 118. The resource that requires traffic to come through the local route endpoint can then be accessed using the local route identifier 120 as evidence. This operation does not require a communication over the public internet 122 between accessing the local route 118 and the resource since the local route identifier 120 is provided by the virtual network hosting the local route endpoint. This configuration keeps the resources downstream of the local route more protected from certain varieties of cyber attacks. Further, this configuration of an adaptive authorization policy 110 using the local route endpoint as a named location provides simplified policy management because the local route identifier 120 is immutable (does not change over time). This is in contrast to policy conditions based on public internet addresses, as public internet addresses change. The local route identifier 120 also requires management of a single value as compared to managing a range of public internet addresses that sometimes can number in the hundreds for managing access to a single resource of the private network 102.

Figure 2:
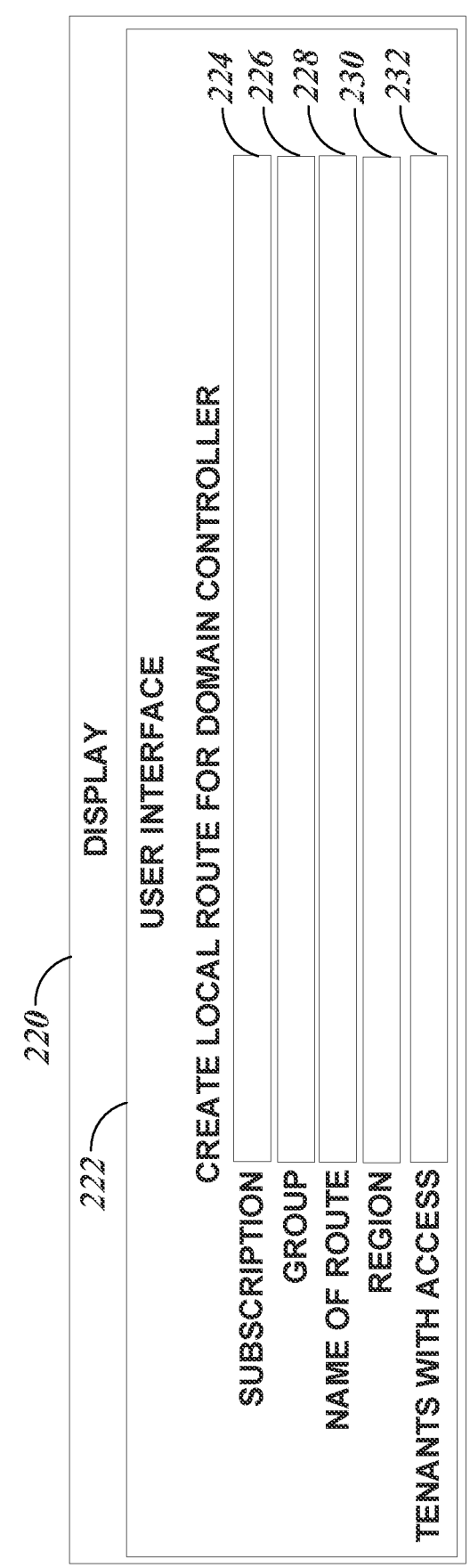
FIG. 2 illustrates, by way of example, a block diagram of an embodiment of a user interface through which a user can create a local route to an authorization service.

FIG. 2 illustrates, by way of example, a block diagram of an embodiment of a user interface 222 through which a user can create a local route to an authorization service. The user interface 222 is merely an example of an application programming interface (API), and a different type or differently configured API can be used in place of the user interface 222 or another user interface discussed herein. The user 108 can generate a local route 118 using the user interface 222.

The user 108 can interact with the user interface 222 through a display 220. The display 220 provides the user 108 with a view of the user interface 222 or another user interface or API. The display 220 is any device capable of communicating with computer processing circuitry and providing output representative of user input through an input device (e.g., a mouse, keyboard, microphone, gaze tracker, touch screen, or the like). The user interface 222 receives input provided in software controls and converts the input to another form that is compatible with a compute device component that operates on the input.

The user interface 222 can receive information for creating a local route 118 that includes an endpoint that operates as a proxy for the authorization service 104. The user 108 can provide data identifying a subscription in subscription text box 224. The subscription indicates the capabilities of the XaaS (a portion of the private network 102) that are available to the user 108. The user 108 can provide data, in a group text box 226, identifying a container that holds related resources. The resource group can include all the resources for the solution, or only those resources that are managed as a group. The resource group stores metadata about the resources. Therefore, when a location is specified for the resource group, one is specifying where that metadata is stored. The user 108 can name the local route 118 in a text box 228. The user 108 can indicate from which geographic regions the local route 118 can be accessed in a location text box 230. With the location condition in adaptive authorization, one can control access to resources based on the network location of a user. The location condition is commonly used to block access from countries/regions where an organization knows traffic should not come from. The user 108 can identify which tenants have access to the local route 118 in a text box 232.

Figure 3:
FIG. 3 illustrates, by way of example, a block diagram of an embodiment of a user interface through which a user can create a private endpoint.
Figure 4:
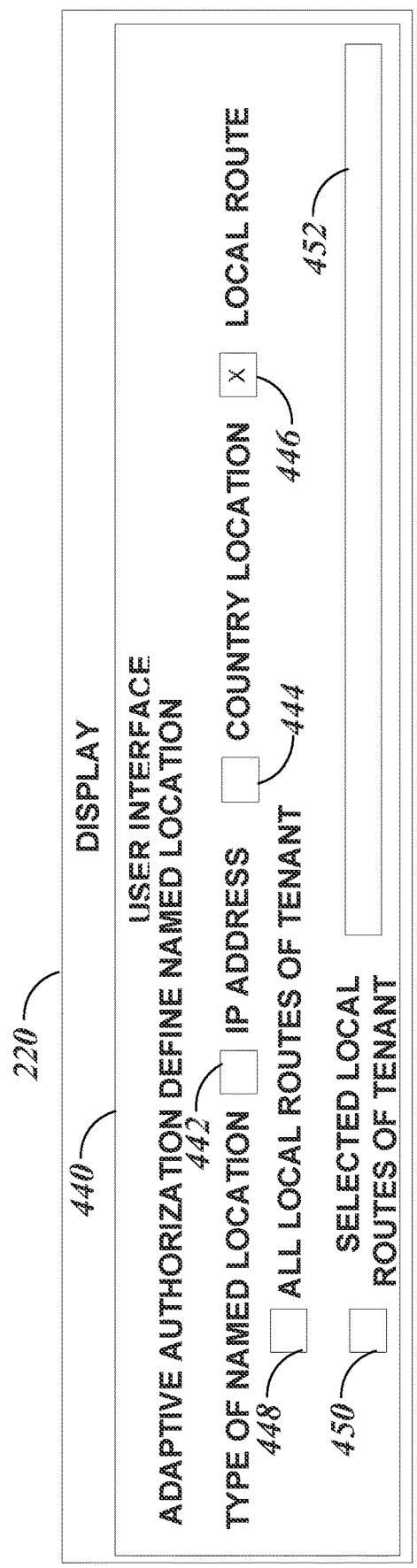
FIG. 4 illustrates, by way of example, a block diagram of an embodiment of a user interface through which a user can add a private endpoint to the conditional access policy.
Figure 5:
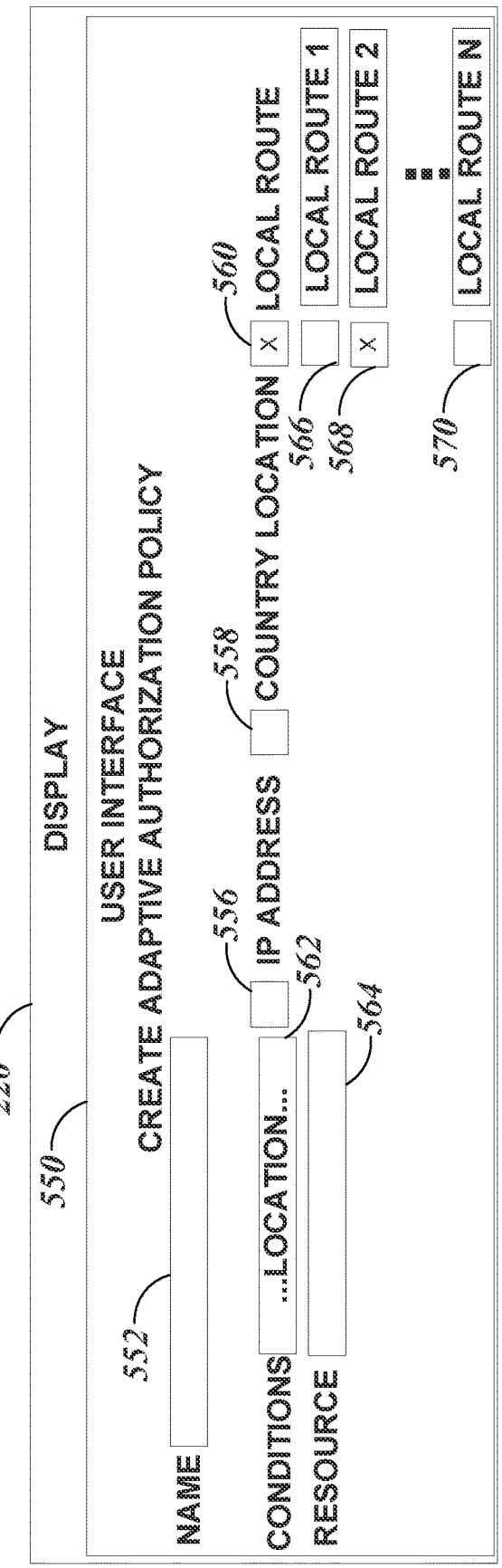
FIG. 5 illustrates, by way of example, a block diagram of an embodiment of a user interface through which a user can define a conditional access policy for the resource.

Note that while FIG. 2 and other FIGS., such as FIGS. 3-5, are described having a user provide information in a text box, a checkbox, or the like, other software controls can be used to provide the same information. For example, a dropdown menu, a sticky menu, a scroll panel, a card, a tab, a slider, a segmented control, a radial dial, an increment control (sometime called a stepper), a radio group, a virtual button, a combination thereof, or the like can be used in place of the text box, select box, check box, or other software control used as an example in the FIGS.

FIG. 3 illustrates, by way of example, a block diagram of an embodiment of a user interface 330 through which a user can create a private endpoint. The private endpoint can be represented by a local route endpoint 660 (see FIG. 6) that is configured as a destination for the local route 118 generated using the user interface 222.

The user 108 can provide data identifying a subscription in subscription text box 332. The subscription indicates the capabilities of the XaaS (a portion of the private network 102) that are available to the user 108. The user 108 can provide data, in a resource type text box 334, identifying a resource type of a resource that is the endpoint of the local route 118. For a local route endpoint that is serving as a proxy for the authorization service 104, the resource type can be a local route. The user 108 can provide the name of the local route endpoint 660 in a text box 336. The user 108 can indicate an endpoint name of the local route 118 in a text box 338. The endpoint name is the natural language identity of the local route endpoint 660 (see FIG. 6) that serves as the location through which the user 108 must access the app 114 or other resource of the private network 102.

FIG. 4 illustrates, by way of example, a block diagram of an embodiment of a user interface 440 through which a user can add a private endpoint to the adaptive authorization policy 110. The private endpoint can be represented by the local route endpoint 660 (see FIG. 6) that is connected as a destination for the local route 118 generated using the user interface 222. The private endpoint can be hosted by a virtual machine of the virtual network 112 such that the user 108 needs to be logged onto the virtual machine to access a resource of the private network 102 through the private endpoint.

The user 108 can indicate a type of named location through which the resource is to be accessed using a select box. An IP address select box 442, when selected, indicates that the user 108 must access through a defined IP address. A country location select box 444, when selected, indicates that the user must access the resource from a defined geographical region. A local route select box 446 (which is selected in the example of FIG. 4), when selected, indicates that the user must access the resource through the local route endpoint 660 (see FIG. 6). The user 108 can indicate that the resource is accessible through any local route of the tenant by selecting an all private links select box 448. The user 108 can indicate that the resource is accessible through only one or more defined local routes of the tenant by selecting a selected local routes of tenant select box 450. The user 108 can specify which one or more local routes the resource is accessible through by entering the local route name in a text box 452.

FIG. 5 illustrates, by way of example, a block diagram of an embodiment of a user interface 550 through which a user can define an adaptive authorization policy 110 for the resource. The user interface 550 allows the user to indicate conditions that must be fulfilled for the user 108 to interact with a specified resource. The user 108 can provide a name for the adaptive authorization policy 110 being defined in a text box 552. The user can indicate conditions to be satisfied for access to the resource in a text box 562. The conditions, in the example of FIG. 5, include a named location condition. The user 108 can indicate a name of the resource associated with the adaptive authorization policy 110 being defined in text box 564.

An IP address select box 556, when selected, indicates that the user 108 must access through a defined IP address. A country location select box 558, when selected, indicates that the user must access the resource through a defined geographical region. A local route select box 560 (which is selected in the example of FIG. 5), when selected, indicates that the user must access the resource through the local route endpoint 660 (see FIG. 6). The user 108 can indicate that the resource is accessible through any local routes of the tenant by selecting all private links select boxes 566, 568, 570. The user 108 can indicate that the resource is accessible through only one or more defined local routes of the tenant by selecting a subset of the selected local route select boxes 566, 568, 570.

The user interfaces 222, 330, 440, 550 allow the user 108 to define a local route that maintains traffic between a resource in the private network 102 and the authorization service 104 to be completely within the private network 102, generate a private endpoint 660 (see FIG. 6) that will serve as a proxy for the authorization service 104, define a named location that corresponding the private endpoint 660, and generate an adaptive authorization policy 110 (see FIG. 1) that forces traffic to go through the private endpoint 660 to access a specified resource, respectively.

Figure 6:
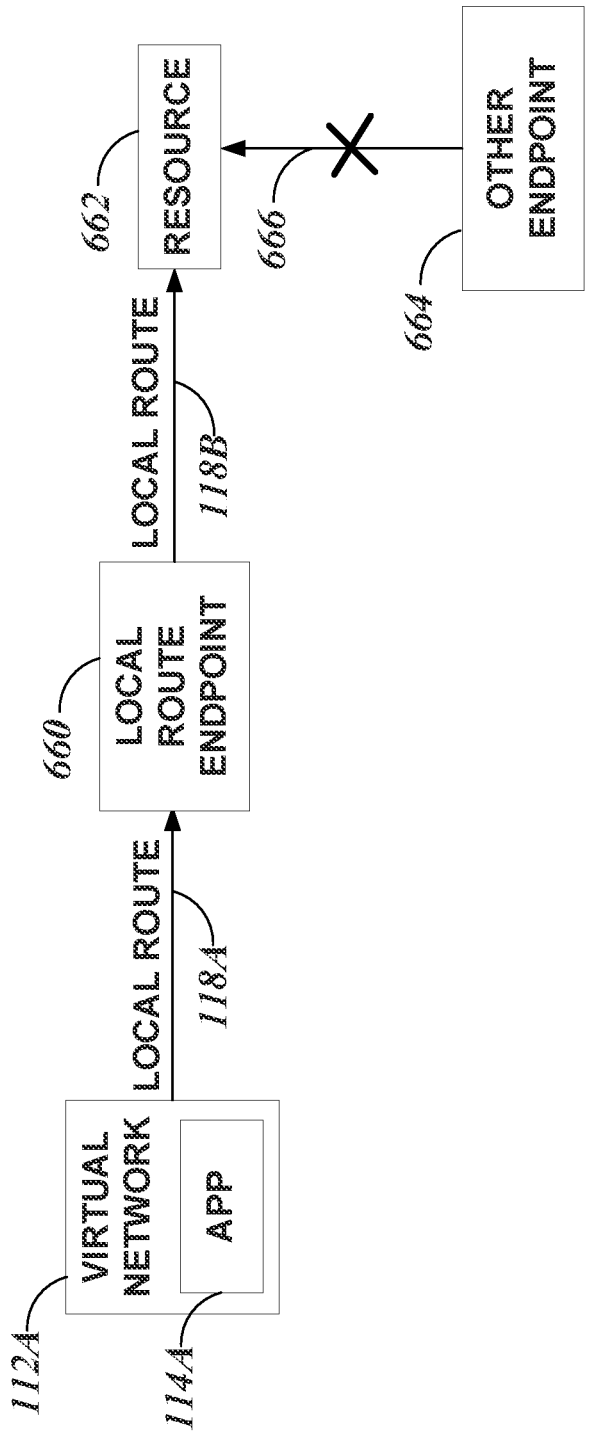
FIG. 6 illustrates, by way of example, a diagram of an embodiment of different endpoints attempting to access a resource 662 that includes a conditional access policy that requires access through a local route endpoint 660.

FIG. 6 illustrates, by way of example, a diagram of an embodiment of different endpoints attempting to access a resource 662 that includes an adaptive authorization policy that requires access through a local route endpoint 660. Assume that the resource 662 includes an adaptive authorization policy 110 that forces access through the local route endpoint 660. In the example of FIG. 6, a virtual network 112A hosts an app 114A. A user 108 of the virtual network 112A wishes to access a resource 662 of the private network 102. To accomplish this access, the user 108 accesses the local route endpoint 660 through a local route 118A between the virtual network 112A and the local route endpoint 660. Then, from the local route endpoint 660, the user 108 accesses the resource through another local route 118B. Since the resource 662 is associated with an adaptive authorization policy 110 that requires access through the local route endpoint 660, the user 108 is granted access because they accessed the resource 662 through the local route endpoint 660 and they had sufficient permissions (or satisfied an adaptive authorization policy) as enforced by accessing the virtual network 112A, the app 114A, or a combination thereof. Evidence that the user 108 had sufficient permissions can include the local route identifier 220 that is provided by a virtual network 112 hosting the virtual network endpoint 660. A user attempting to access the resource 662 from any other endpoint 664 is denied access (indicated by arrow 666 with an "X" therethrough) because it is not accessing through the local route endpoint 660 required by the adaptive authorization policy of this example.

Figure 7:
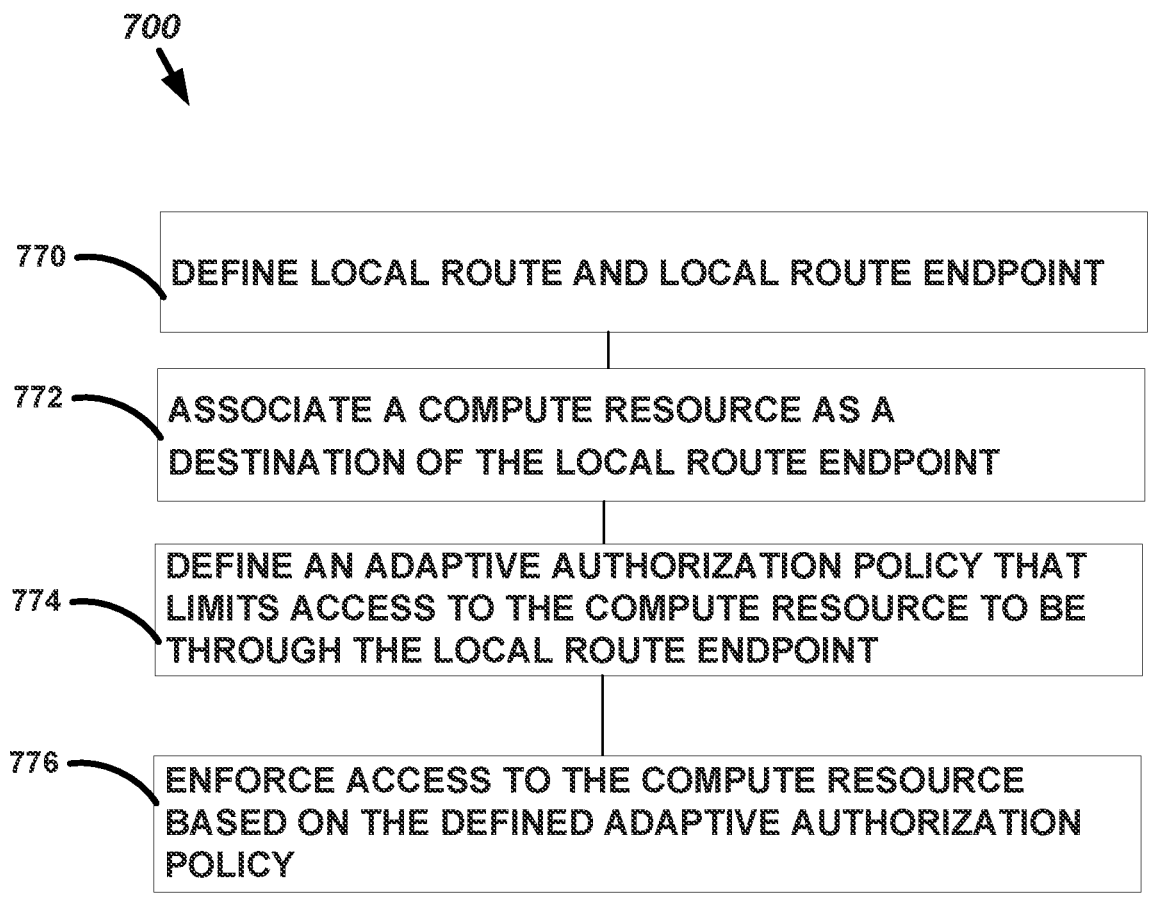
FIG. 7 illustrates, by way of example, a diagram of an embodiment of a method for conditional access through a local route endpoint.

FIG. 7 illustrates, by way of example, a diagram of an embodiment of a method 700 for adaptive authorization through a local route endpoint. The method 700 as illustrated includes defining a local route and a corresponding local route endpoint, at operation 770; associate a compute resource as a destination of the local route endpoint, at operation 772; define an adaptive authorization policy, that limits access to the compute resource to be through the local route endpoint, at operation 774; and enforce access to the compute resource based on the defined adaptive authorization policy, at operation 776.

The method 700 can further include, wherein the local route is entirely within a private network. The method 700 can further include, wherein the local route endpoint is associated with a local route identifier and the method includes providing the local route identifier as evidence that the access is through the local route endpoint. The method 700 can further include defining a second adaptive authorization policy that limits access to the local route endpoint, a first virtual network hosting the local route endpoint, or a second virtual network through which the local route endpoint is accessible. The method 700 can further include, wherein the adaptive authorization policy includes the local route endpoint as a named location. The method 700 can further include, wherein the local route endpoint serves a proxy for an authorization service that controls access to compute resources of the private network. The method 700 can further include, wherein the local route identifier is immutable.

Figure 8:
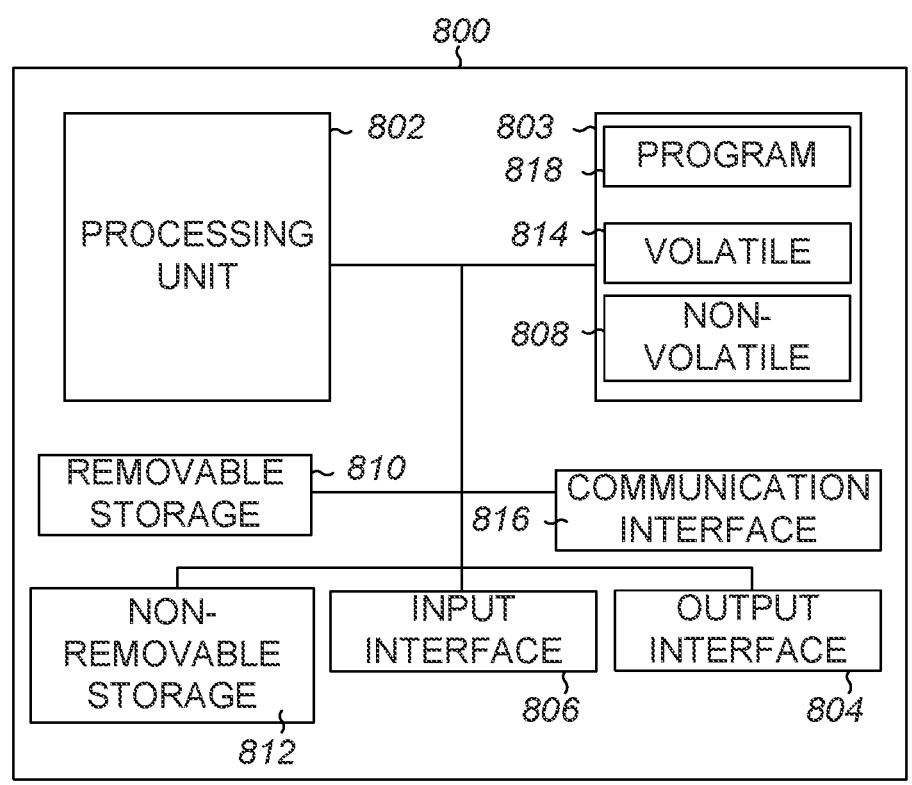
FIG. 8 illustrates, by way of example, a block diagram of an embodiment of a machine (e.g., a computer system) to implement one or more embodiments.

FIG. 8 illustrates, by way of example, a block diagram of an embodiment of a machine 800 (e.g., a computer system) to implement one or more embodiments. The machine 800 can implement a technique for improved adaptive authorization using a local route. The private network 102, client device 113, authorization service 104, virtual network 112, DNS 116, local route 118, data store 124, firewall 126, or a component thereof can include one or more of the components of the machine 600. One or more of the method 700, private network 102, client device 113, authorization service 104, virtual network 112, DNS 116, local route 118, data store 124, firewall 126, apps 114, or a component or operations thereof can be implemented, at least in part, using a component of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include— or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 818 may be used to cause processing unit 802 to perform one or more methods or algorithms described herein.

The operations, functions, or algorithms described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware, or a combination thereof. Multiple functions may be performed in one or more subsystems as desired, and the embodiments described are merely examples. The software may be executed on processing circuitry, such as can include a digital signal processor, ASIC, microprocessor, central processing unit (CPU), graphics processing unit (GPU), field programmable gate array (FPGA), or other type of processor operating on a computer system, such as a personal computer, server, or other computer system, turning such computer system into a specifically programmed machine. The processing circuitry can, additionally or alternatively, include electric and/or electronic components (e.g., one or more transistors, resistors, capacitors, inductors, amplifiers, modulators, demodulators, antennas, radios, regulators, diodes, oscillators, multiplexers, logic gates, buffers, caches, memories, GPUs, CPUs, field programmable gate arrays (FPGAs), or the like. The terms computer-readable medium, machine readable medium, and storage device do not include carrier waves or signals to the extent carrier waves and signals are deemed too transitory.

ADDITIONAL NOTES AND EXAMPLES

Example 1 can include a method for adaptive authorization through a local route, the method comprising defining a local route and a corresponding local route endpoint, associating a compute resource as a destination of the local route endpoint, defining an adaptive authorization policy that limits access to the compute resource to be through the local route endpoint, and enforcing access to the compute resource based on the defined adaptive authorization policy.

In Example 2, Example 1 can further include, wherein the local route is entirely within a private network.

In Example 3, at least one of Examples 1-2 can further include, wherein the local route endpoint is associated with a local route identifier and the method includes providing the local route identifier as evidence that the access is through the local route endpoint.

In Example 4, at least one of Examples 1-3 can further include defining a second adaptive authorization policy that limits access to the local route endpoint, a first virtual network hosting the local route endpoint, or a second virtual network through which the local route endpoint is accessible.

In Example 5, at least one of Examples 1-4 can further include, wherein the adaptive authorization policy includes the local route endpoint as a named location.

In Example 6, at least one of Examples 2-5 can further include, wherein the local route endpoint serves a proxy for an authorization service that controls access to compute resources of the private network.

In Example 1, at least one of Examples 3-6 can further include, wherein the local route identifier is immutable.

Example 8 includes a compute system comprising a memory and processing circuitry coupled to the memory, the processing circuitry configured to perform the method of one of Example 1-7.

Example 9 includes a machine-readable medium including instructions that, when executed by a machine, cause the machine to perform operations comprising the method of one of Examples 1-7.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A method for adaptive authorization through a local route, the method comprising:
    defining the local route to and from a corresponding local route endpoint, wherein the local route endpoint (1) is identified by an immutable globally unique local route identifier, (2) acts as a proxy for authorization services that controls access to compute resources of a private network and (3) communicates and receives all traffic therethrough only within the private network;
    associating a compute resource of the private network as a destination of the local route endpoint;
    defining an adaptive authorization policy that limits access to the compute resource to be through the local route endpoint;
    enforcing access to the compute resource based on the defined adaptive authorization policy; and
    providing the local route identifier to the compute resource as evidence that the access is through the local route endpoint.

2. The method of claim 1, wherein the local route is entirely within the private network.

3. The method of claim 1, further comprising defining a second adaptive authorization policy that limits access to the local route endpoint, a first virtual network hosting the local route endpoint, or a second virtual network through which the local route endpoint is accessible.

4. The method of claim 2, wherein the adaptive authorization policy includes the local route endpoint as a named location.

5. A compute system comprising:
    a memory;
    processing circuitry coupled to the memory, the processing circuitry configured to:
    define a local route to and from a corresponding local route endpoint, wherein the local route endpoint (1) is identified by an immutable globally unique local route identifier, (2) acts as a proxy for authorization services that controls access to compute resources of a private network and (3) communicates and receives all traffic therethrough to be only within the private network;
    associate a compute resource of the private network as a destination of the local route endpoint;
    define an adaptive authorization policy that limits access to the compute resource to be through the local route endpoint;
    enforce access to the compute resource based on the defined adaptive authorization policy; and
    provide the local route identifier to the compute resource as evidence that the access is through the local route endpoint.

6. The compute system of claim 5, wherein the local route is entirely within the private network.

7. The compute system of claim 5, further comprising defining a second adaptive authorization policy that limits access to the local route endpoint, a first virtual network hosting the local route endpoint, or a second virtual network through which the local route endpoint is accessible.

8. The compute system of claim 5, wherein the adaptive authorization policy includes the local route endpoint as a named location.

9. A machine-readable medium including instructions that, when executed by a machine, cause the machine to perform operations comprising:
    defining a local route to and from a corresponding local route endpoint, wherein the local route endpoint (1) is identified by an immutable globally unique local route identifier, (2) acts as a proxy for authorization services that controls access to compute resources of a private network and (3) communicates and receives all traffic therethrough to be only within the private network;
    associating a compute resource of the private network as a destination of the local route endpoint;
    defining an adaptive authorization policy that limits access to the compute resource to be through the local route endpoint;
    enforcing access to the compute resource based on the defined adaptive authorization policy; and
    providing the local route identifier to the compute resource as evidence that the access is through the local route endpoint.

10. The machine-readable medium of claim 9, wherein the local route is entirely within the private network.

11. The machine-readable medium of claim 9, further comprising defining a second adaptive authorization policy that limits access to the local route endpoint, a first virtual network hosting the local route endpoint, or a second virtual network through which the local route endpoint is accessible.

12. The machine-readable medium of claim 9, wherein the adaptive authorization policy includes the local route endpoint as a named location.

* * * * *